Oct. 16, 1956      E. E. MEUSY      2,766,961
VALVE
Filed May 12, 1953
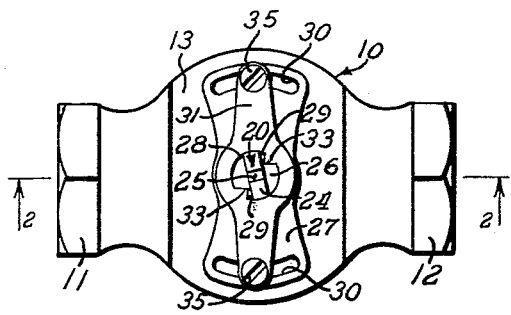
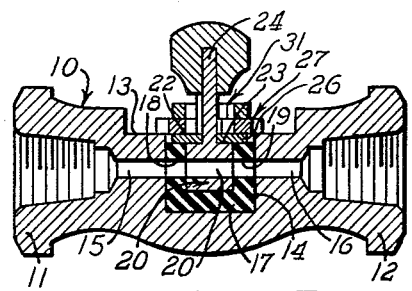
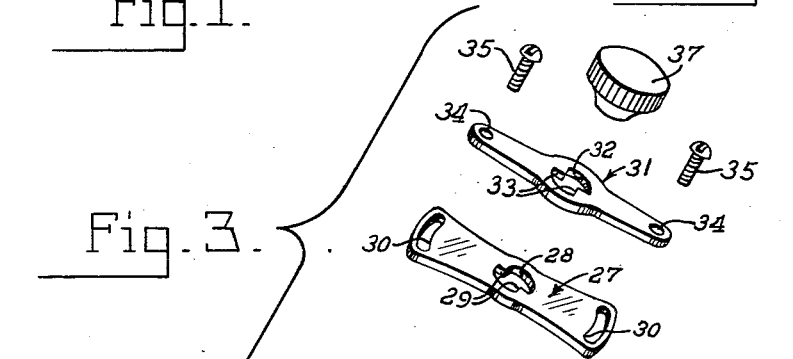
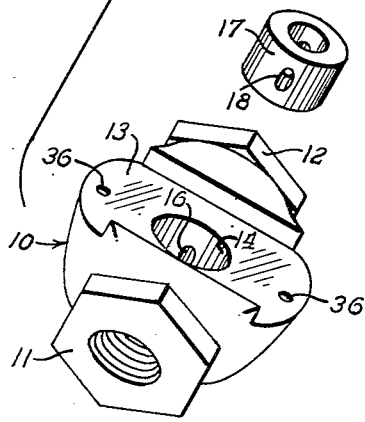
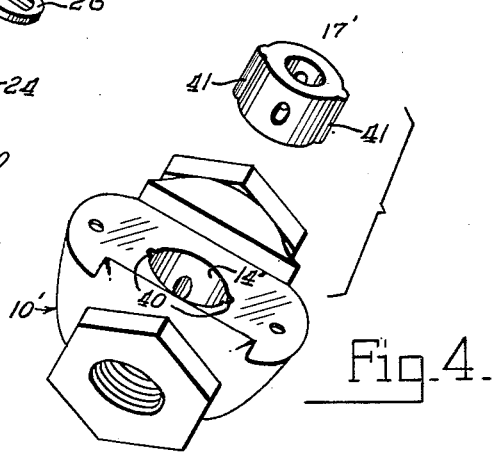
INVENTOR.
Eugene E. Meusey,
BY

United States Patent Office 2,766,961
Patented Oct. 16, 1956

2,766,961

VALVE

Eugene E. Meusy, Milwaukee, Wis., assignor to Milwaukee Gas Specialty Company, Milwaukee, Wis., a corporation of Wisconsin Application May 12, 1953, Serial No. 354,563

3 Claims. (Cl. 251—171)

This invention relates to improvements in valves, and more particularly to valves adapted for use in controlling the flow of fuel to pilot burners of fluid fuel burning equipment.

It has been standard practice in the valve art to utilize spring loaded tapered plug type valves in fluid fuel lines. The manufacture of this type of valve involves expensive precision machining or grinding operations in order to produce the required taper and finish on the plug and in the plug-receiving bore to provide a proper gas tight seal.

It is a principal object of the present invention to provide an improved valve which is inexpensive because precision machining or grinding operations are not required in its manufacture.

Another object of the invention is to provide an improved valve which is simple and compact in construction and which does not require any springs to maintain a proper seal therein.

A more specific object of the invention is to provide an improved valve of the character described wherein the plug and the plug-receiving bore may be cylindrical in shape, there being a tubular liner of resilent material in said bore and in which the plug is rotatably positioned and there being means for placing the resilient liner under axial compression to cause said liner to sealingly engage both the plug and the bore regardless of irregularities in the surfaces thereof. Thus, the plug and the valve body may be mass produced with ordinary machining operations and without the necessity of holding extremely close tolerances while nevertheless affording a gas tight seal.

Another object is to provide an improved valve of the character described having cylindrical rather than tapered sealing surfaces thereby eliminating the need for springs which are required where tapered surfaces are used and also thereby affording a valve of smaller dimensions which takes less space.

Another object of the invention is to provide an improved valve of the character described in which the valve bore may be formed with surface irregularities which are frictionally engaged by the resilient liner when the latter is placed under compression and tend to prevent rotation of said liner in said bore.

A more specific object of the invention is to provide an improved valve of the character described wherein the resilient liner which may be provided with integral external lugs and wherein the valve bore is formed with cooperating lug-receiving recesses to provide additional anchoring of said liner against rotation where mere frictional engagement may not be sufficient.

With the above and other objects in view, the invention consists of the improved valve and all of its parts and combinations, as set forth in the claims and all equivalents thereof.

In the drawing accompanying and forming a part of this specification, in which two forms of the invention are shown, and wherein like characters of reference indicate the same parts in all of the views:

Figure 1 is a plan view of one form of the improved valve with the knob or handle removed;

Figure 2 is a vertical sectional view of the improved valve taken along the line 2—2 of Figure 1;

Figure 3 is an exploded perspective view showing individually the parts of the valve of Figure 1 and 2; and, Figure 4 is an exploded perspective view of the valve body and resilient liner of another form of the improved valve.

Referring more particularly to the drawing, the numeral 10 indicates a valve body having an internally threaded inlet connection 11 and an opposite, internally threaded outlet connection 12. The valve body 10 is provided with a substantially flat external surface 13, and a cylindrical bore 14 which extends transversely inwardly from said surface between the inlet 11 and the outlet 12. Passages 15 and 16 open into diametrically opposite sides of the bore 14 and afford communication between said bore and the connections 11 and 12 respectively.

A cylindrical tubular liner 17 of rubber-like material, which may be cup-shaped in form, fits snugly in the bore 14 and is formed with diametrically opposed ports 18 and 19 which register respectively with the passages 15 and 16. A plug type valve member 20, cylindrical in shape, is snugly received in the liner 17 as shown, said plug having a diametrically extending bore 21 which is adapted to register with the ports 18 and 19 of the liner when the plug is in one position. The outer end of the plug 21 has a pair of coplanar surfaces 22 and 23, and a stem 24 of generally rectangular cross-sectional shape which projects axially from said plug between said surfaces, said stem being preferably slotted, as at 25 (Figures 1 and 3), to provide a snap-on connection for a manually engageable handle or knob 37.

A diametrically slotted washer 26 is positioned on the stem 24 and overlays the surfaces 22 and 23 of the plug, said washer also overlapping a substantial portion of the annular upper end surface of the liner 17. The combined axial length of the liner 17 in an uncompressed state, plus the thickness of the washer 26, is preferably slightly greater than the depth of the bore 14, i. e., the distance from the surface 13 to the bottom surface of the bore 14. A retaining and stop plate 27 is formed with a central aperture 28 to receive the stem 24 and overlays the washer 26 and the valve body surface 13. The plate 27 is provided with a pair of stop shoulders 29 in the aperture 28 which shoulders are engageable by the flat sidewall surfaces of said stem. The plate 27 is also formed with a pair of opposite arcuate slots 30 which are concentric with the aperture 28.

A stop plate 31 overlays the plate 27 and is provided with a central aperture 32 through which the stem 24 projects, said plate being formed with a pair of spaced shoulders 33 in the aperture 32 which shoulders are engageable by the flat sidewall surfaces of said stem. The plate 31 has a pair of apertures 34 which register with the slots 30 of the plate 27. A pair of screws 35 extend through the apertures 34 and slots 30, and are threaded into suitable apertures 36 in the surface 13 of the valve body 10.

The screws 35 hold the plate 27 flat against the surface 13 of the valve body 10 and said plate thereby holds the washer 26 in a position wherein its upper surface is flush with the valve body surface 13. Since the uncompressed length of the liner 17 plus the thickness of the washer 26 is greater than the depth of the bore 14, the liner 17 is axially compressed by the washer 26 as the plate 27 is drawn flat against the surface 13 by the screws 35. Compression of the liner 17 in the manner described causes the material thereof to expand radially and to conform to any irregularities in the surfaces of the plug 20 and bore 18, sealingly engaging said surfaces.

There is preferably a film of lubricant, such as silicone oil, between the engaging surfaces of the plug 20 and liner 17 tending to prevent the liner from adhering to the plug.

In the manufacture of the improved valve, the bore 14 may be relatively rough and need not be held to any finer than normal drill tolerances. In fact a certain amount of surface irregularity is desirable in the bore 14, so that a frictional engagement with the liner 17 is produced which tends to prevent rotation of said liner when the plug 20 is rotated. If desired, the valve body 10 may be die cast and the bore 10 cast in said body. The cylindrical plug 20 can be mass produced on automatic screw machines and can be provided with a sufficiently smooth surface by an inexpensive barrel tumbling operation in which the plugs are tumbled in a liquid having a viscosity sufficiently high to permit the plugs to rub against one another but not to hammer against each other during tumbling. The manufacture of the cylindrical plug 20 does not require the precision machining or grinding operations required of conventional tapered plugs and plug-receiving bores. Any slight machining irregularities in the plug or bore of the improved valve are taken up by the compressed liner 17. Similarly, during the molding of the liner 17, the inner and outer diameters thereof need not be held to close tolerances, since upon compression of said liner any irregularities are compensated for. Nevertheless, as will be apparent a gas tight seal is afforded.

With respect to the plates 27 and 31, the shoulders 33 of the plate 31 permit the stem 24, and hence the plug 20, to be rotated approximately 90 degrees, from the full open position shown in Figure 2 to a fully closed position. The shoulders 29 of the plate 27 also permit 90 degrees rotation of the stem 24, but only when said shoulders register with the shoulders 33. This relationship exists when the plate 27 is rotated in a clockwise direction, as viewed in Figure 1, until one end of the slots 30 engages the screws 35. Rotation of the plate 27 in the reverse direction positions the shoulders 29 in a manner to reduce the permissible rotation of the stem in an opening direction by the amount said plate is thus rotated. For example, when the plate 27 is in the intermediate position of Figure 1, the stops 29 prevent rotation of the stem in a clockwise direction into engagement with the stops 33 of plate 31, and therefore the plug 20 is prevented from being rotated to full open position. Thus, the stops 29 determine the open position to which the valve 20 can be turned by the handle 37, and thus the position of said stops determine the capacity of the improved valve.

An additional function of the plates 31 and 27 and of washer 26 is to provide means for axially retaining the plug 20 in operative position within the liner and valve body. Since the plug 20 is not tapered, as are conventional valve plugs, a proper seal between the plug 20 and the liner 17 does not require that the plug be biased axially, and therefore no springs are required for this purpose. Elimination of springs lends compactness to the improved valve and also provides a substantial cost saving.

It is obvious that the improved valve may be incorporated in a device which also includes other mechanism and which may utilize a casting which is relatively large and irregular in shape. In this type of device it is difficult to check and maintain dimensions, and therefore the use of the present valve in place of a tapered plug valve requiring expensive machining and close tolerances substantially reduces both the production cost on the device and the scrap loss on the casting.

In Figure 4 is shown a further form of the invention comprising a liner 17' and body 10' constructed in accordance with the invention. In this form, however, the bore 14' is formed with recesses 40 which take the form of axially extending grooves. The liner 17' is provided with axially extending peripheral lugs 41 which are adapted to seat in the recesses 40 and tend to prevent rotation of said liner when the latter is positioned in the bore 14'. This provides engagement of the liner with the bore additional to the frictional engagement previously described.

The forms of the invention shown and described are for the purpose of disclosure only and are not intended to in any way limit the scope of the invention or confine the same to a particular use. Various other changes and modifications may be made without departing from the spirit of the invention, and all of such changes are contemplated as may come within the scope of the appended claims.

What is claimed as the invention is:

1. A valve comprising, a valve body having an external surface, a cylindrical bore opening to said surface, and having inlet and outlet openings communicating with said bore, a unitary cup-shaped liner of resilient material positioned coaxially within said valve bore and formed with a cylindrical bore also opening to said valve surface, said liner also having openings communicating with said valve inlet and outlet openings, valve means for said valve body comprising a cylindrical valve plug portion positioned coaxially within said liner and valve bores, said plug being formed with flow passage means adapted to cooperate with said liner openings to control the flow between the valve body inlet and outlet openings, said plug being formed with shoulders and a substantially rectangular stem portion projecting from the open end of said liner, a diametrically slotted washer surrounding said stem positioned in contact with said plug shoulders and said liner, the combined thickness of said washer and free length of said liner being larger than the depth of said valve bore, and combination stop and sealing means including a plate having a surface engaging said valve body surface and formed with an aperture through which said stem portion projects, said aperture having spaced shoulders formed therein for engagement with said valve stem to limit rotational movement of said stem and plug, attachment of said plate to said valve body surface effecting engagement thereof with said washer to thereby effect axial compression of said liner and cause the latter to sealingly engage said plug and said valve bore.

2. A valve comprising, a valve body having a substantially flat external surface, a cylindrical valve bore formed in said valve body perpendicular to said surface and opening to said surface, said valve body having inlet and outlet openings communicating with said bore, a unitary cup-shaped cylindrical liner of resilient material positioned coaxially within said valve bore and formed with a cylindrical bore also opening to said valve surface, said liner also having openings communicating with said valve inlet and outlet openings, valve means for said valve body comprising a cylindrical valve plug portion positioned coaxially within said liner and valve bores, said plug being formed with flow passage means adapted to cooperate with said liner openings to control the flow between the valve body inlet and outlet openings, said plug having a pair of cut away opposite side portions forming a pair of coplanar radial surfaces and an integral substantially rectangular stem portion projecting from the open end of said liner and having opposite arcuate surfaces forming continuations of said cylindrical plug surface, a diametrically slotted washer non-rotatably surrounding said stem and having a diameter larger than that of said plug portion and smaller than said valve bore and positioned in contact with said coplanar surfaces of said plug portion and with the adjacent end surface of said liner, the combined thickness of said washer and free length of said liner being larger than the depth of said valve bore, and combination stop and sealing means including a plate having a flat surface engaging said valve body surface and formed with a central aperture through which said stem portion projects, said aperture having spaced shoulders formed therein for engagement with said substantially rectangular valve stem to thereby limit rotational movement of said stem and plug about their axes, attachment of said plate to said valve body surface effecting engagement thereof with said washer to thereby effect axial compression of said liner and cause the latter to sealingly engage said plug and said valve bore.

3. A valve comprising, a valve body having a substantially flat external surface, a cylindrical valve bore formed in said valve body perpendicular to said surface and opening to said surface, said valve body being formed with inlet and outlet openings communicating with said bore, a unitary cup-shaped cylindrical liner of resilient material positioned within said valve bore and formed with a cylindrical bore also opening to said valve surface, said liner also having openings communicating with said valve inlet and outlet openings, a valve means for said valve body comprising a cylindrical valve plug portion positioned coaxially within said liner and valve bores, said plug being formed with flow passage means adapted to cooperate with said liner openings to control the flow between the valve body inlet and outlet openings, said plug having a pair of cut away opposite side portions forming a pair of coplanar radial surfaces and an integral substantially rectangular stem portion projecting from the open end of said liner and having opposite arcuate surfaces forming continuations of said cylindrical plug surface, a diametrically slotted washer non-rotatably surrounding said stem having a diameter larger than that of said plug portion and smaller than said valve bore and positioned in contact with said coplanar surfaces of said plug portion and with the adjacent end surface of said liner, the combined thickness of said washer and free length of said liner being larger than the depth of said valve bore, and combination adjustable stop and sealing means including a first plate having a flat surface engaging said valve body surface and formed with a pair of oppositely disposed arcuate apertures and a central aperture through which said stem portion projects, said central aperture having spaced shoulders formed therein for engagement with said substantially rectangular valve stem to thereby limit rotational movement of said plug and stem about their axes, and a second plate having a flat surface for attachment to said first plate and formed with a pair of oppositely disposed apertures for adjustable registration with said arcuate apertures in said first plate, said second plate also being formed with a central aperture through which said stem portion projects and having spaced shoulders formed therein for engagement with said valve stem, attachment of said plates to said valve surface effecting engagement of said first plate with said washer to thereby effect axial compression of said liner and cause the latter to sealingly engage said plug and said valve bore.

References Cited in the file of this patent

UNITED STATES PATENTS

| | | |
|---|---|---|
| 1,760,222 | Whitmarsh | May 27, 1930 |
| 1,817,258 | Klinger | Aug. 4, 1931 |
| 1,946,745 | Johnston | Feb. 13, 1934 |
| 2,063,699 | Schellin | Dec. 8, 1936 |
| 2,424,210 | Sutton | July 15, 1947 |
| 2,592,056 | Mueller | Apr. 8, 1952 |
| 2,675,207 | Mueller | Apr. 13, 1954 |

FOREIGN PATENTS

| | | |
|---|---|---|
| 17,778 | Great Britain | 1888 |
| 8,661 | Great Britain | 1901 |
| 575,913 | Great Britain | Mar. 11, 1946 |
| 1,061,012 | France | 1953 |